United States Patent [19]

Weber

[11] Patent Number: 4,789,106

[45] Date of Patent: Dec. 6, 1988

[54] COMBINED COFFEE BEAN WEIGHER AND GRINDER WITH SELECTABLE MEASURED QUANTITIES

[75] Inventor: Robert L. Weber, New Canaan, Conn.

[73] Assignee: Grindmaster Corporation, Louisville, Ky.

[21] Appl. No.: 100,039

[22] Filed: Sep. 18, 1987

[51] Int. Cl.⁴ .............................. B02C 23/02
[52] U.S. Cl. ............................ 241/101.2; 241/34; 241/100
[58] Field of Search ............. 241/101.2, 34, 100, 241/101.5, 301; 222/510

[56] References Cited

U.S. PATENT DOCUMENTS

| | | | |
|---|---|---|---|
| 415,312 | 11/1889 | Schneider | 222/510 X |
| 489,620 | 1/1893 | Widness | 222/510 X |
| 749,027 | 1/1904 | Clarke | |
| 2,538,413 | 1/1951 | Chard | 161/10 |
| 2,615,567 | 10/1952 | Campbell | 209/73 |
| 3,642,080 | 2/1972 | Forman et al. | 177/110 |
| 3,796,349 | 3/1974 | Weber | 222/55 |
| 4,605,175 | 8/1986 | Weber | 241/56 |

Primary Examiner—Howard N. Goldberg
Assistant Examiner—Joseph M. Gorski
Attorney, Agent, or Firm—Maurice L. Miller, Jr.

[57] ABSTRACT

A coffee beam weigher and grinder comprises at least two storage hoppers each respectively receiving and storing a supply of coffee beans, the hoppers each defining a bottom outlet opening through which coffee beans are gravitationally flowably releasable. Sliding hopper valve plates control release of coffee beans from a selected one of the storage hoppers, and coffee beans are released into a bean bucket deployed below the hoppers. The bean bucket is mounted on a bucket arm pivotal between upper and lower positions and is releasably held in the upper position by magnetic attraction between first and second magnetic elements. The bean bucket has a bottom discharge opening which is blocked by a depending stem valve when the bucket arm is in its upward position. The second magnetic element is one of a plurality each of which provides for release when a selected amount of coffee beans are received in the bean bucket. Upon release of the magnetic elements, the bean bucket pivots downwardly and bean flow into a coffee grinder. The discharge from the coffee grinder is caught in a brew basket or a ground coffee receptacle bagger having a valved bottom discharge spout for filling coffee bags. A rotatable control knob selectively operatively positions one of the second magnetic elements and also selects the hopper and a grind time for the grinder.

40 Claims, 10 Drawing Sheets

COMBINED COFFEE BEAN WEIGHER AND GRINDER WITH SELECTABLE MEASURED QUANTITIES

FIELD OF INVENTION

The invention herein relates to a combined weighing dispenser for dispensing a predetermined amount of a granular flowable material and grinder for grinding the measured amount of material into fine particles, with provision for selecting among a plurality of predetermined weights of the flowable granular material to be measured and ground. In particular, the invention relates to a combined coffee bean weigher and grinder which dispenses a selected one of a plurality of predetermined weights of coffee beans and thereafter grinds the coffee beans preparatory to use in a coffee maker.

BACKGROUND OF THE INVENTION

Many types of material-handling operations involve the dispensing of successive discreet measured quantities of flowable material from a bulk supply thereof and subsequent grinding of the materials into more fine particles. A particular operation of this type is the weighing and grinding of coffee beans preparatory to fresh brewing coffee in a coffee maker. Restaurants represent a specific environment where the coffee making process is performed frequently.

It will be appreciated that brewed coffee served to restaurant patrons should be of the highest quality and that the quality can be enhanced by utilizing the proper amount of coffee in the brewing process and by utilizing coffee which has been freshly ground. In order that the brewed coffee be reasonably fresh at the time it is served to the restaurant patrons, it is also desirable that the restaurant operator be able to brew different amounts of coffee at different times, depending upon anticipated demand. Each different amount of coffee requires a separate, distinct and accurate amount of ground coffee beans.

A substantial number of restaurant patrons now request decaffeinated coffee and those restaurant patrons are becoming more discriminating regarding the quality of their coffee. As a result, more restaurants are serving freshly brewed decaffeinated coffee to those patrons rather than instant decaffeinated coffee. Accordingly, the requirement of a selectable accurately measured amount of freshly ground coffee beans is also applicable to the brewing and serving of high quality decaffeinated coffee.

Further, while high accuracy is desired in coffee weighing and grinding procedures, coffee making operations are frequently performed by relatively untrained personnel at times of high activity, and it is therefore necessary to provide apparatus that can be readily operated with a minimum amount of time and attention to detail.

My U.S. Pat. No. 3,796,349 for a Weighing Dispenser provides apparatus for accurately weighing a quantity flowable material, such as coffee beans, ground coffee or powdered coffee. A limitation of that apparatus is that a grinding operation is required either prior to or subsequent to the use of the weighing dispenser, thus occupying additional amounts of operator time as well as utilizing additional valuable restaurant work area for a separate grinding machine. Additionally, my prior weighing dispenser is capable of handling only a single kind of flowable material at one time and is adapted to measure only a single predetermined amount of that material. Accordingly, although my prior device is capable of high accuracy and repeatability in measurement, it solves only a portion of the overall criteria for efficient coffee operations, particularly for busy environments such as restaurants.

SUMMARY OF THE INVENTION

It is a principal object of the invention herein to provide apparatus for accurately measuring and thereafter grinding flowable granular materials.

It is another principal object of the invention herein to provide apparatus for dispensing a predetermined weight of coffee beans and thereafter grinding them.

It is an additional object of the invention herein to provide apparatus for dispensing and grinding a predetermined weight of coffee beans wherein one of a plurality of predetermined weights may be selected.

It is a further object of the invention herein to provide apparatus for dispensing and grinding a predetermined weight of coffee beans wherein one of at least two types of coffee beans stored in the apparatus may be selected.

It is a another object of the invention to provide apparatus for weighing and grinding coffee beans which are stored within the apparatus which is also adapted for grinding coffee beans which are not stored in the apparatus.

It is an additional object of the invention to provide a coffee bean measuring and grinding dispenser which requires minimal operator time and attention but nevertheless achieves accurate results.

It is a still further an object of the invention herein to provide a receptacle for receiving ground coffee which is adapted to load the ground coffee into bags or containers.

A combined dispensing and grinding apparatus according to the invention herein, set in the environment of coffee bean weighing and grinding, comprises a substantially vertical housing having at least one and preferably two coffee bean storage hoppers at its upper end. A corresponding number of hopper valves control flowing discharge from the hopper(s). Positioned below the hopper(s) is a weighing mechanism comprising a pivotally mounted bucket arm mounting a bean-receiving bucket. When empty, the bucket arm is biased to an upward position by a counterweight and is releasably held in that position against the weight of in-flowing coffee beans by two operatively-deployed cooperative magnetic elements, whereby the bucket arm carrying the bean bucket pivots downwardly upon accumulation of a weight of coffee beans sufficient to cause separation of the magnetic elements.

At least one of the cooperative magnetic elements is mounted on a selector member together with at least one other similar magnetic element, the selector member being movable to position a selected one of these magnetic elements into operative position. The various cooperative magnetic elements mounted on the selector member preferably correspond to different predetermined weights of coffee beans. Each such cooperative magnetic element is preferably adjustably mounted on the selector member for adjustment which provides for release of the pivotally mounted bucket arm upon accumulation of the desired predetermined weight of coffee beans.

Means responsive to downward movement of the bucket arm causes the operative hopper valve to cut off the flow of coffee beans from the supply hopper. Downward movement of the bean bucket with the bucket arm also releases the beans into the input of a coffee grinder mounted therebelow through a bottom discharge opening in the bean bucket. In the preferred embodiment, means responsive to the downward movement of the bucket arm also initiates operation of the coffee grinder, and the selector member which selects the weight of coffee beans dispensed also sets an operating time period for the coffee grinder appropriate to the quantity of beans dispensed.

According to an aspect of the invention herein, a stem valve depends into the bean bucket and has a distal end closely adjacent but not touching the bean bucket about the periphery of the discharge opening, whereby the stem valve blocks the outflow of coffee beans as the bean bucket is filling. When the bean bucket moves downwardly with the pivot arm, the discharge opening separates from the distal end of the stem valve, permitting an out-flow of coffee beans. The separation is limited and promotes a controlled out-flow of coffee beans appropriate to the capacity of the coffee grinder. A keeper mechanism maintains the bucket arm in its downward position as the coffee beans flow thereout, and means are provided for releasing the keeper means and permitting the counterweight to return the bucket arm to its operative weighing position prior to the next operating cycle.

According to another aspect of the invention, a by-pass passage is provided for feeding unweighed coffee beans directly to the grinder, whereby the grinder can be used to grind coffee beans which are not stored in the apparatus.

A coffee maker brew basket is positioned subjacent the coffee grinder for catching the ground coffee. According to a further aspect of the invention, a ground coffee receptacle/ bagger is provided removably positioned below the coffee grinder in place of the usual coffee maker brew basket. The ground coffee receptacle/bagger includes a bottom discharge spout and a lever actuated closure member therefor, wherein the discharge spout may be utilized to discharge ground coffee into bags or other containers.

More specific objects and features of the invention will in part be apparent and will in part appear from a perusal of the following description of the preferred embodiments and claims, taken together with the drawings.

DRAWINGS

Figure 8:
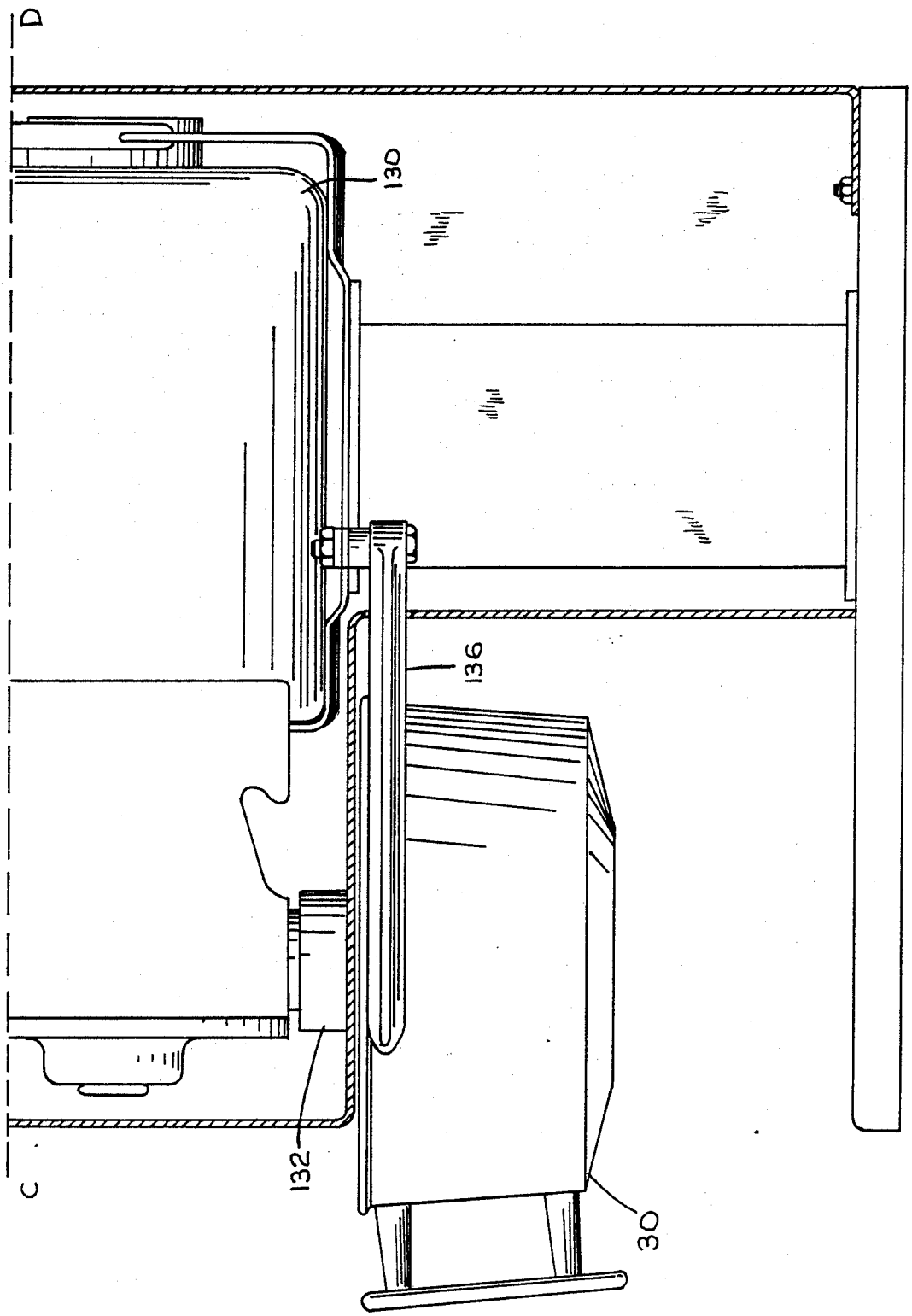
FIG. 8 is a side elevation view, partially cut away, of the lower portion of the coffee bean weighing and grinding apparatus of FIG. 1 showing the grinder output and brew basket support means, namely, that portion of the coffee bean weighing and grinding apparatus of FIG. 1 below the dotted lines C-D of FIG. 1, and also showing a ground coffee receptacle/bagger according to the invention herein.
Figure 10:
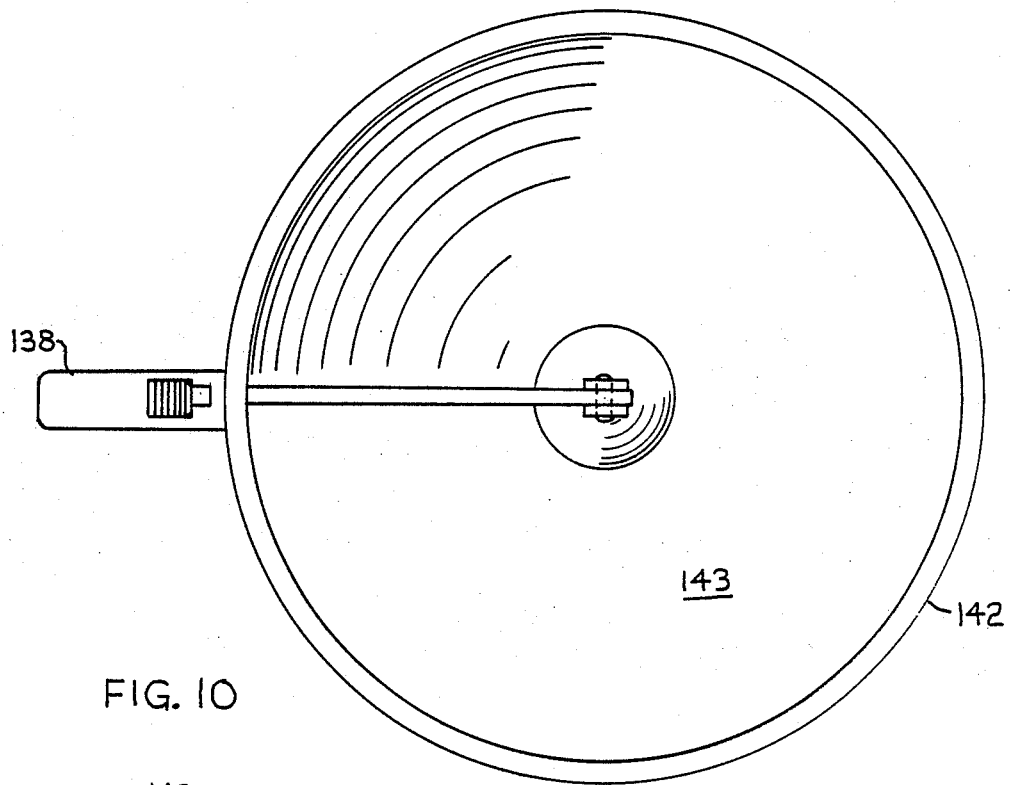
FIG. 10 is a top plan view of the ground coffee receptacle/bagger according to the invention herein illustrated in FIG. 8.
Figure 11:
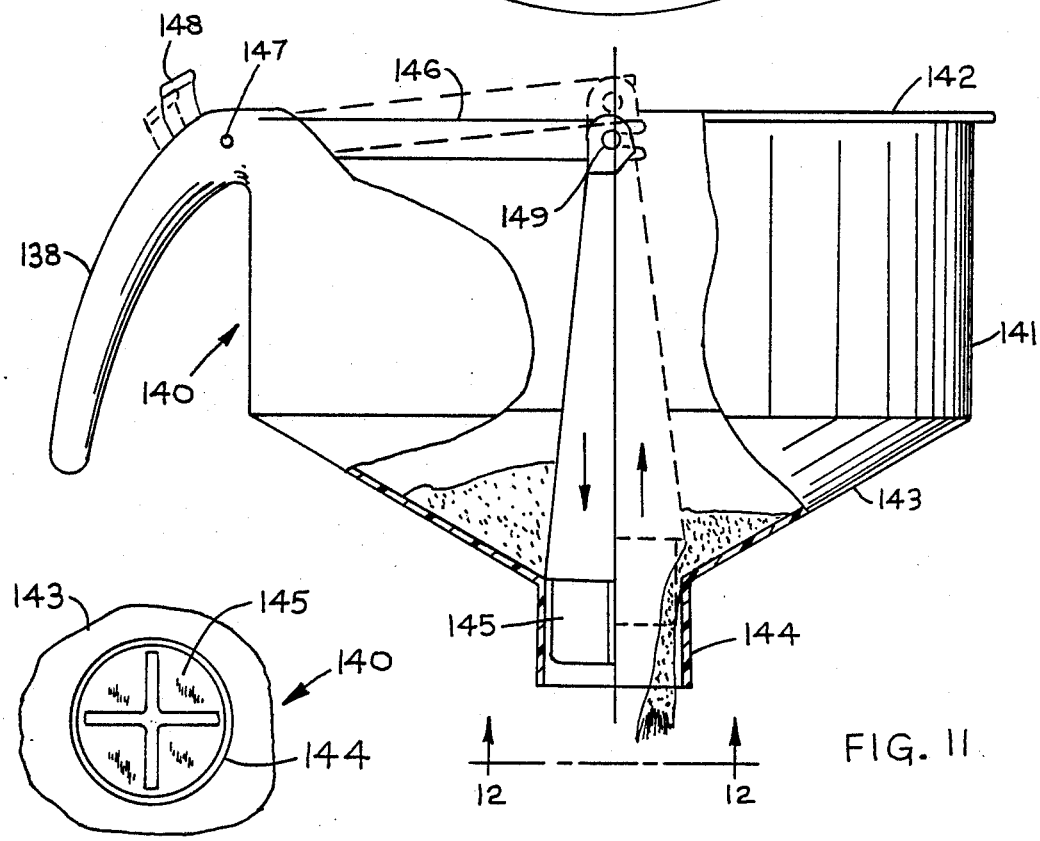
Figure 12:

FIG. 11 is a side elevation view, partially cut away and partially dotted, showing the operation of the ground coffee receptacle/bagger of FIGS. 8 and 10; and FIG. 12 is a bottom fragmentary view of the ground coffee receptacle/bagger of FIGS. 8 and 10, taken from the lines 12—12 of FIG. 11.

The same reference numerals refer to the same elements throughout the various Figures.

DESCRIPTION OF PREFERRED EMBODIMENT

Figure 1:
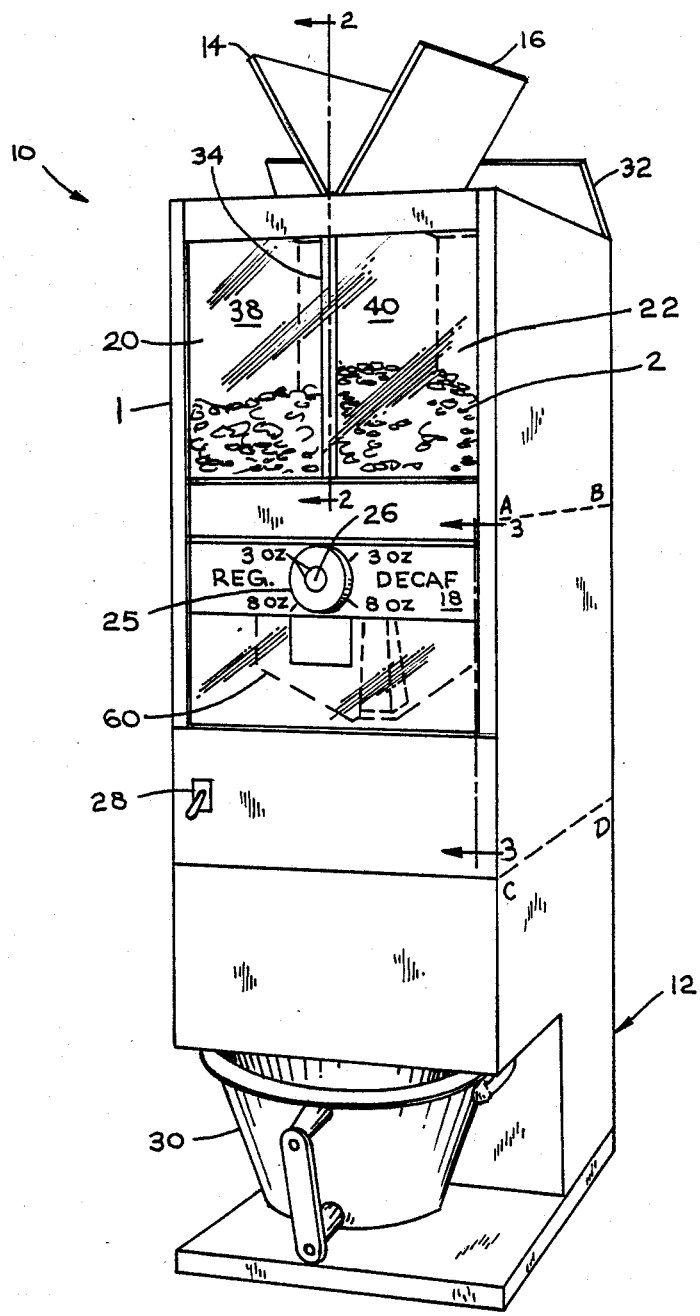
FIG. 1 is a perspective view of a coffee bean weighing and grinding apparatus according to the invention herein.

With reference to FIG. 1, there is shown a coffee bean weighing and grinding apparatus 10 according to the invention herein. The coffee bean weighing and grinding apparatus 10 comprises a housing 12 including pivotally-mounted lids 14, 16 respectively covering coffee bean storage hoppers 20 and 22. The coffee bean storage hoppers each contain a different type of coffee bean, e.g., the hopper 20 may contain regular coffee beans 1 and the other hopper 22 may contain decaffeinated coffee beans 2, as marked on the front panel 18. A control knob 25 and a reset knob 26 control operation of a mechanism for releasing coffee beans from a selected one of the hoppers into a bean bucket 60 and for accumulating a predetermined amount of coffee beans in the bean bucket. The coffee weighing and grinding apparatus further comprises a coffee grinder mounted within the housing but not visible in FIG. 1, which receives weighed coffee beans from the bean bucket, grind them and deposits them in a coffee maker brew basket 30 or other receptacle supported on the housing 12. An additional pivotally-mounted lid 32 provides access to a passage 36 feeding directly to the coffee grinder, so that the coffee grinder may be utilized to grind coffee not stored in one of the hoppers 20, 22. A switch 28 controls operation of the coffee grinder for that purpose. Such ground coffee is also captured in the brew basket 30 or in a ground coffee receptacle/bagger more fully described below.

Figure 2:
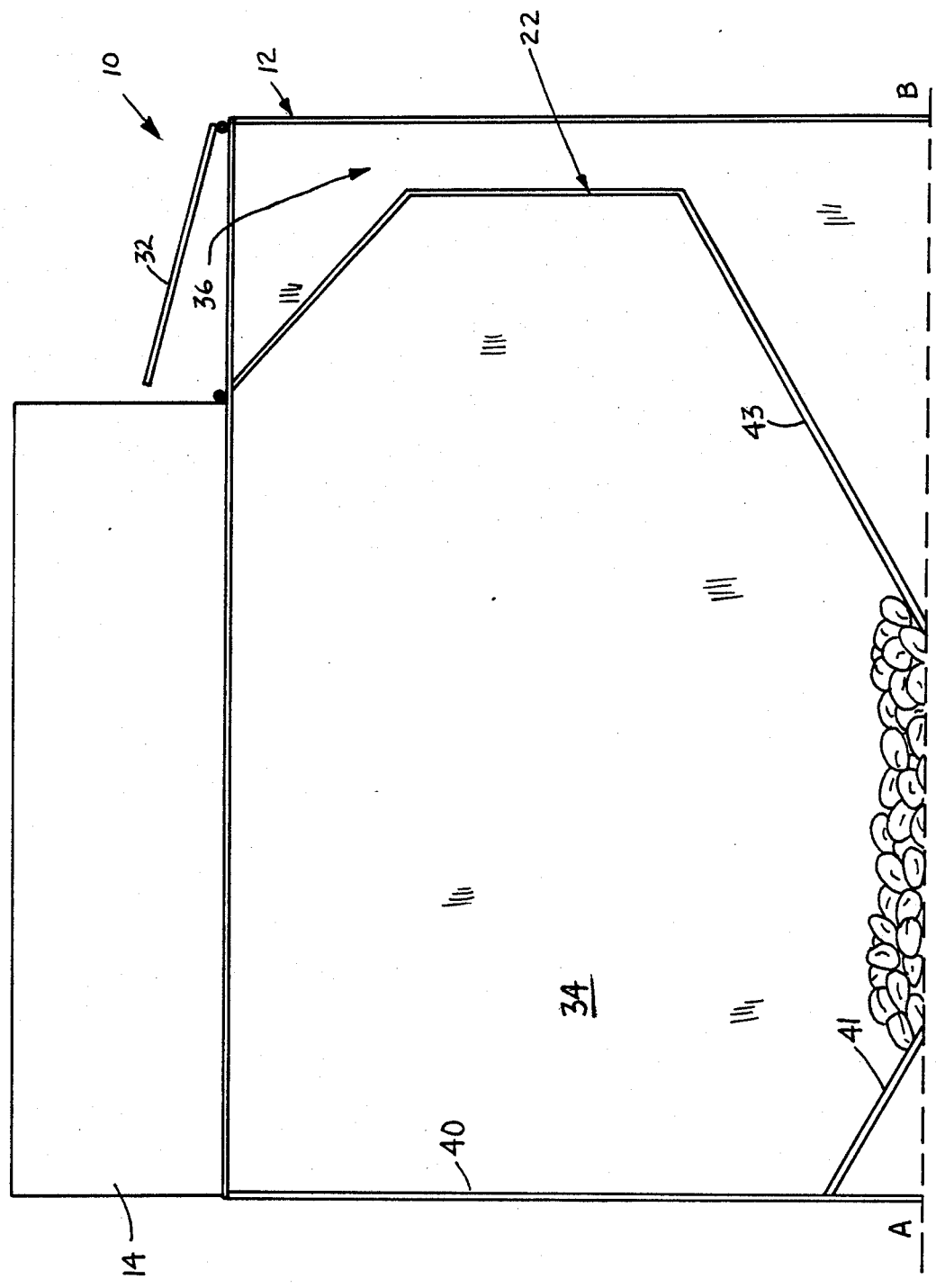
FIG. 2 is a sectional view, taken along the lines 2—2 of FIG. 1, of the upper, hopper portion of the coffee bean weighing and grinding apparatus of FIG. 1, namely, that portion above the dotted line A-B of FIG. 1.

With reference to FIGS. 1 and 2, a vertical central divider panel 34 separates hopper 20 from hopper 22, and the lid 32 is seen to provide access to a passage 36.

The passage 36 bypasses the hoppers and the weighing mechanism described below. As also seen in FIGS. 1 and 2, the hoppers 20 and 22 have transparent front panels 38 and 40. This provides a visual check on the level and condition of coffee beans in each of the hoppers as well as an appetizing view of the coffee beans. As also seen in FIGS. 2 and 3, the hoppers have inclined bottom panels, such as bottom panel 41, 43 so that the beans will flow gravitationally freely therefrom.

Figure 3:
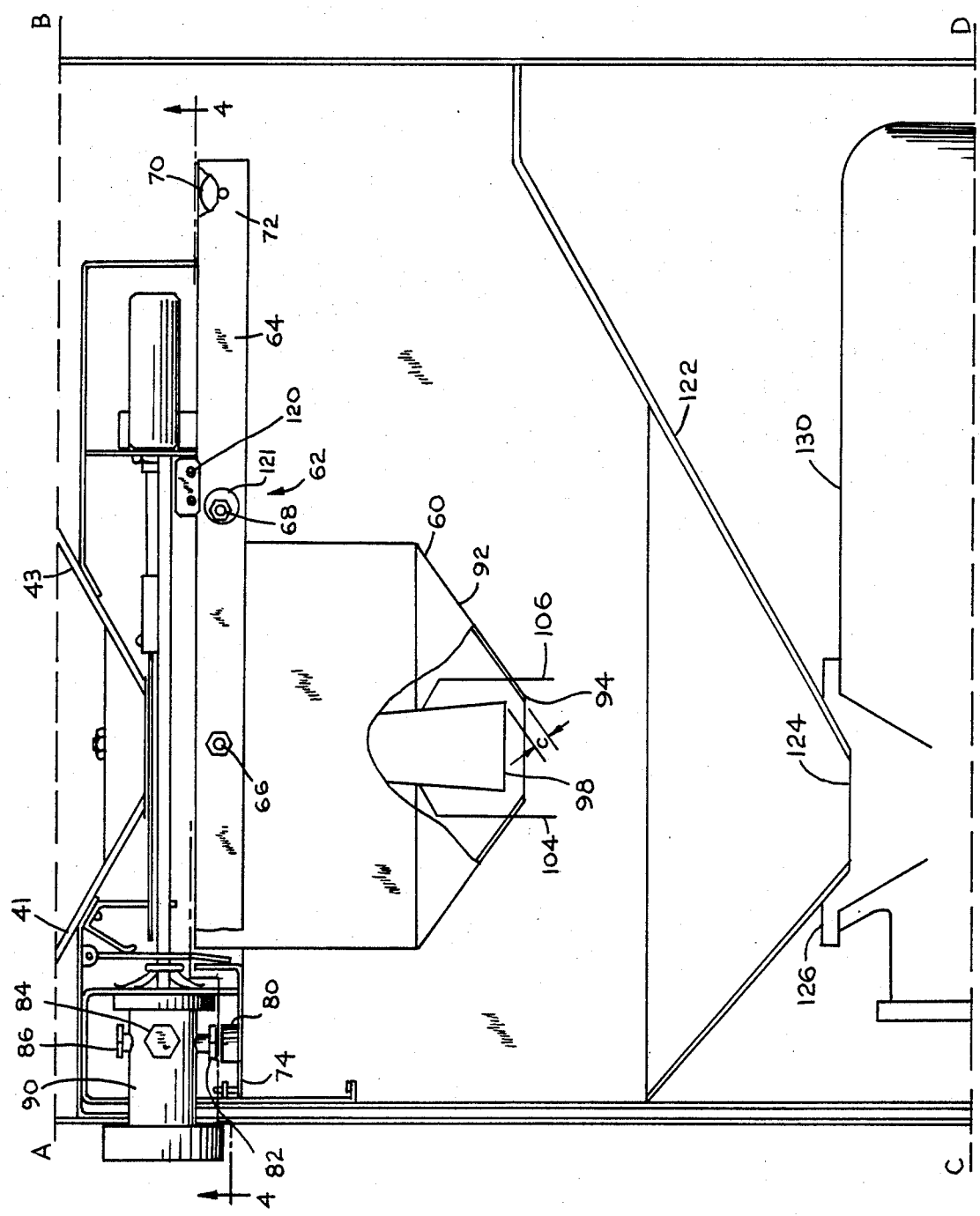
FIG. 3 is a sectional view, taken along the lines 3—3 of FIG. 1, showing the hopper valve, weight selection, bean bucket and grinder input of the coffee bean weighing and grinding apparatus of FIG. 1, namely, that portion between the dotted line A-B and C-D of FIG. 1.
Figure 4:
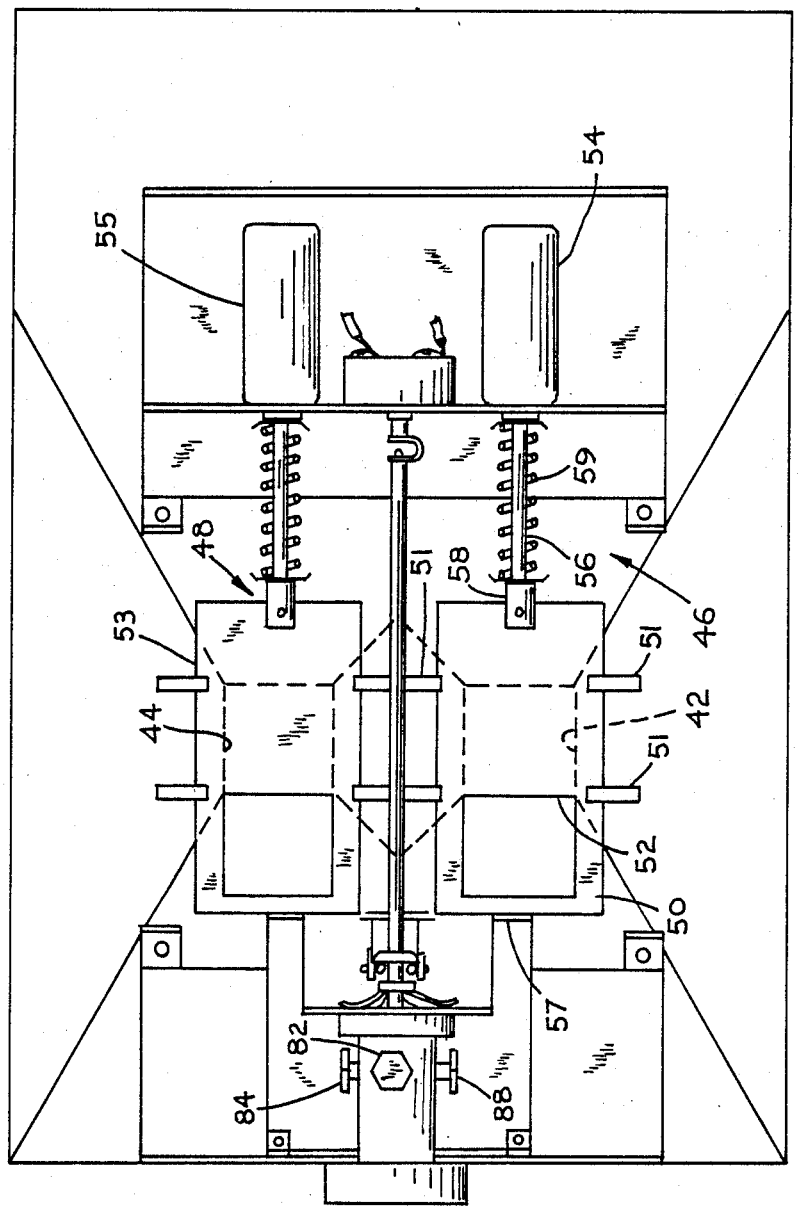
FIG. 4 is a sectional view, taken along the lines 4—4 of FIG. 3, showing the hopper, hopper valve and weight selection portions of the coffee bean weighing and grinding apparatus of FIG. 1.

With reference to FIGS. 3 and 4, the hoppers 20 and 22 have bottom outlet openings 42 and 44, respectively, and release of coffee beans from the hoppers 20, 22 is controlled by hopper valve assemblies 46 and 48, respectively. The hopper valve assembly 46 includes a hopper valve plate 50 which is mounted for sliding horizontal movement on slide supports 51 (FIG. 4 only). The hopper valve plate 50 has an opening 52, which, when aligned with the bottom outlet 42 of hopper 20, permits coffee beans to flow downwardly out of the hopper. The sliding movement of the hopper valve plate 50 to its "open" position is provided by operation of a solenoid 54, the rod 56 of the solenoid being attached to the hopper valve plate 50 by a clevis 58. Actuation of the solenoid will be discussed more fully below. A return spring 59 biases the hopper valve plate 50 to a closed position against a stop 57 as seen in FIG. 4. The hopper valve assembly 48 controlling the flow of coffee beans from hopper 22 is similar, including a hopper valve plate 53 and a solenoid 55.

Figure 5:
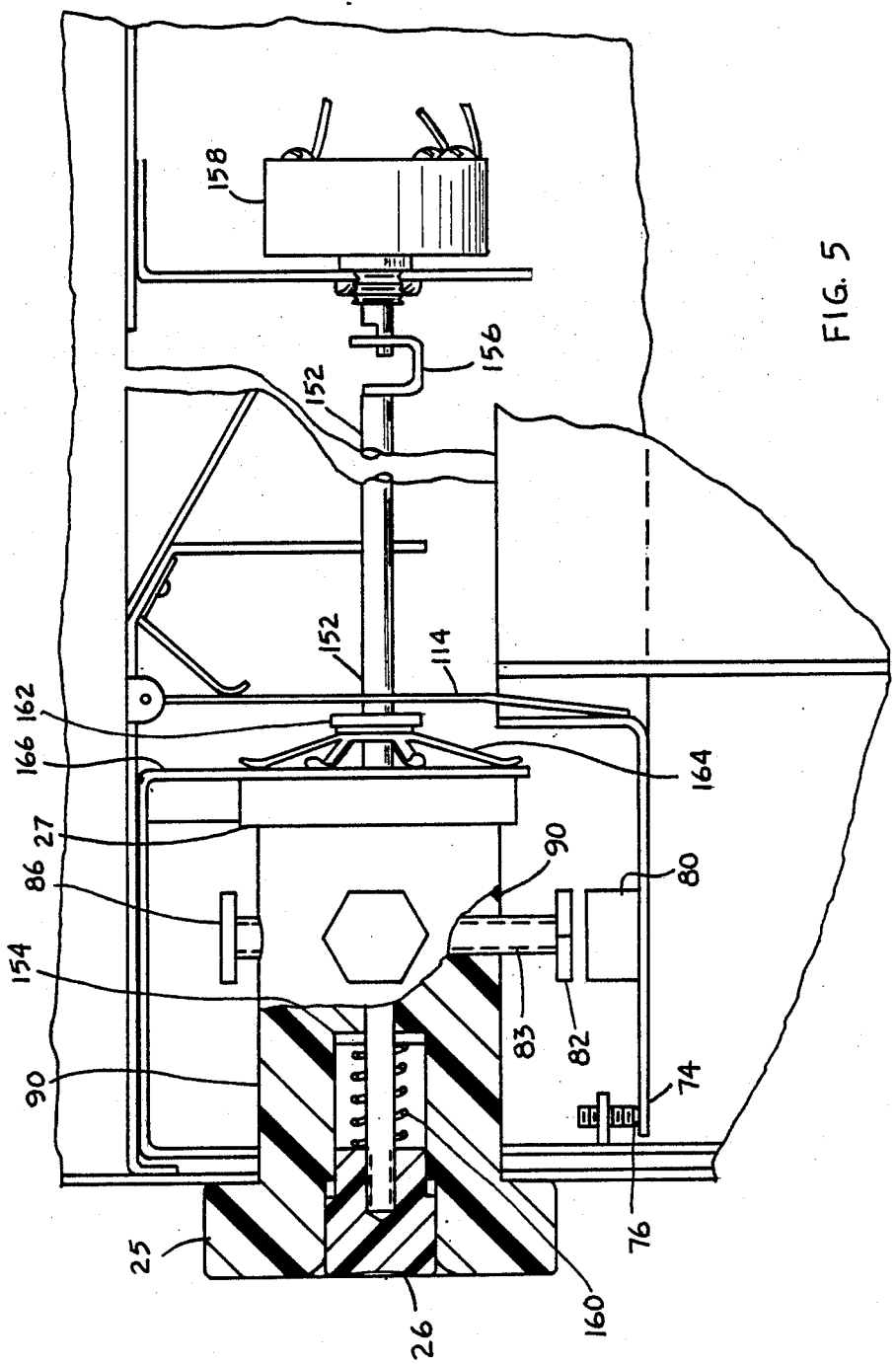
FIG. 5 is an enlarged, partly sectional and partially cut away view of the weight selection mechanism of the coffee bean weighing and grinding apparatus of FIG. 1, corresponding to portions of FIG. 3.
Figure 6:
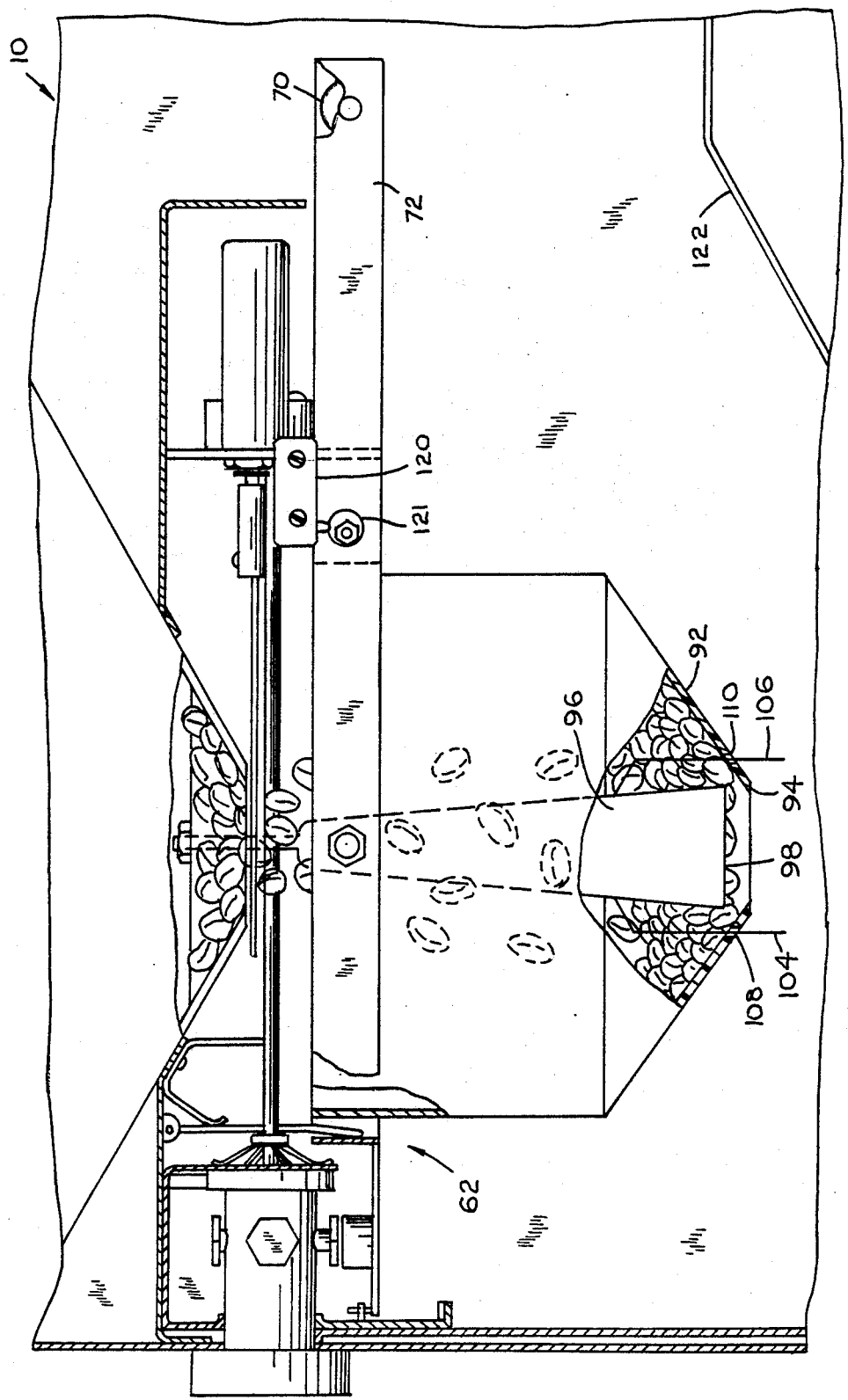
FIG. 6 is a view similar to FIG. 3 of the coffee bean weighing and grinding apparatus of FIG. 1, showing coffee beans flowing into the bean bucket.

Coffee beans released from one of the hoppers 20, 22 through an open associated hopper valve are received in the bean bucket 60 comprising a part of a coffee bean weighing assembly 62, which is illustrated in FIGS. 3 and 5-7. The bean bucket 60 is pivotally mounted to a bucket arm 64 at 66 and the bucket arm 64 is pivotally mounted to a frame member of housing 12 at 68. One end 72 of the bucket arm 64 extends past the pivotal mounting point 68 opposite the bucket 60 and a counterweight 70 is mounted near the end 72 of the bucket arm 64 for biasing the bucket arm to a horizontal position as shown in FIGS. 3, 5 and 6. The counterweight 70 biases the opposite end 74 of the bucket arm 64 upwardly against an adjustable stop 76 as best seen in FIG. 5.

The bucket arm 64 is releasably maintained in its horizontal position by co-action of magnetic elements comprising a further portion of the weighing assembly 62, namely, a magnet 80 and a selected one of a four armatures 82, 84, 86 and 88. The armatures are mounted on the rearwardly extending barrel 90 of selector knob 25. The knob 25 is rotatable to place one of the armatures in operative position with respect to the magnet 80. It is well known that the force of magnetic attraction between magnetic elements, such as the magnetic 80 and one of the armatures 82, 84, 86 or 88, is a function of the proximity of the elements. Each of the armatures is adjustably positioned with respect to the barrel 90 of knob 25, whereby the distance between the selected armature and the magnet 80 is adjustable. The adjustment is provided for by mounting each armature on a threaded shaft, e.g. armature 82 on threaded shaft 83, which is received in barrel 90, the threads permitting fine adjustment of the radial extension of the mounted armature. The magnet 80 is preferably a permanent magnet and the commercially-available Alnico permanent magnets are known to exhibit constant magnetic force over a long period of time, whereby the calibration of the coffee bean weigher and grinder 10 is stable.

Figure 7:
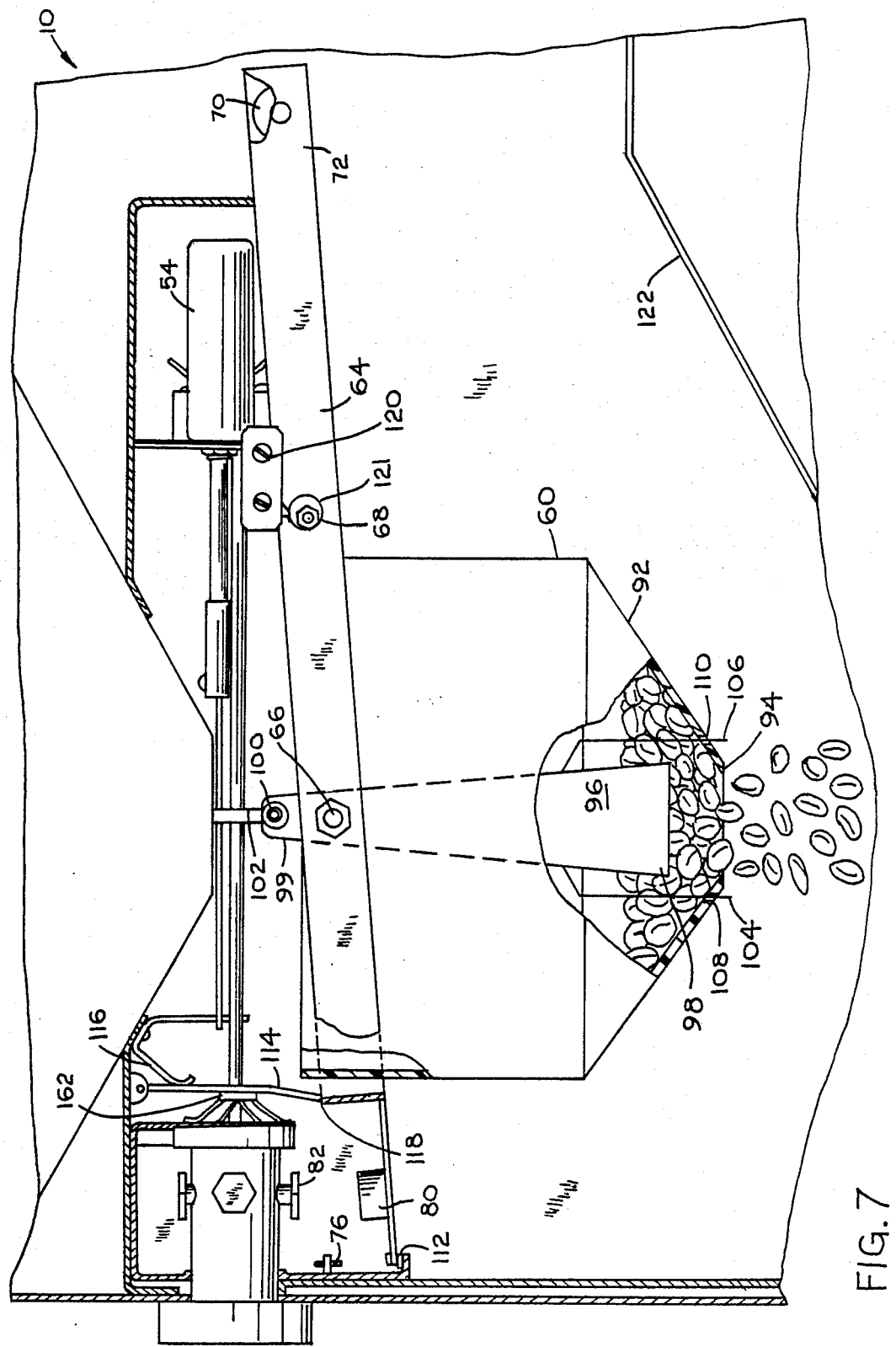
FIG. 7 is a view similar to FIGS. 3 and 6 of the coffee bean weighing and grinding apparatus of FIG. 1, showing coffee beans flowing from the bean bucket.

This distance between the magnet 80 and the selected armature is adjusted so that the desired weight of beans flowing from the hopper will overcome the magnetic attraction and the counterweight action, releasing the bucket arm 64 to pivot downwardly to the position shown in FIG. 7.

The bean bucket 60 has an inclined converging bottom portion 92 with a central lowermost discharge opening 94. When the bucket arm 62 is in its generally horizontal position (FIG. 3), the discharge opening 94 is blocked by a depending stem valve 96, the distal end 98 of which preferably extends to close proximity with the perimeter of discharge opening 94, but does not touch the bean bucket 60. The clearance C (FIG. 3) between the distal end 98 of the stem valve 96 and the portion of the bean bucket defining the perimeter of discharge opening 94 is somewhat less than the diameter of a small coffee bean, whereby coffee beans will not leak through the valve prematurely. The clearance space assures that there will be no interference between the bean bucket and the stem valve as the bucket and bucket arm return to the horizontal position; any such interference could increase the separation of the magnetic elements and thus alter the weight adjustment. The clearance also assures that there will be no wear between the stem valve and bucket, which would otherwise eventually cause a leak and/or disrupt the weight adjustment. The stem valve 96 preferably tapers from the larger distal end 98 to a smaller mounting end 99, whereby the mounting end 99 does not interfere with the flow of beans from the hoppers 20, 22.

Restaurants using the coffee bean weigher and grinder 10 according to the invention herein often do not take care to level the apparatus and sagging countertops which produce forward lean of the device are of particular concern. A specific problem associated with forward lean of the device is misalignment of the stem valve 96 and the bucket discharge opening 94. To compensate for such possible misalignment, the stem valve 96 is pivotally mounted at 100 (FIG. 7) on a support rod 102 depending from the bottom of the hoppers, whereby the stem valve may pivot in substantially the same manner as the bean bucket 60 pivots on the bucket arm 64. In addition, two elongated guides 104 and 106 extend outwardly and downwardly from the stem valve 96 with the free ends of the guides passing through openings 108, 110 respectively in the bean bucket, whereby the guides maintain alignment between the stem valve 96 and the bean bucket discharge opening 94. The alignment is maintained despite forward (or rearward) lean of the apparatus.

With reference to FIG. 7, when the weight of coffee beans in the bean bucket 60 overcomes the magnetic attraction between the magnet 80 and the armature 82, or other operatively positioned armature, the bucket arm 64 pivots downwardly against the stop 112, creating space under the stem valve 96 through which coffee beans flow out of the bucket discharge opening 94. The separation between the discharge opening 94 and the distal end 98 of stem valve 96 is limited by the stop 112, whereby the flow of coffee beans from the bean bucket 60 is regulated. The downward movement of the bucket arm also operates a microswitch 120 which shuts off current to the active one of solenoids 54, 55, permitting the associated hopper valve plate to be spring biased closed in order to cut off further flow of coffee beans from the hopper. A cam 121 secured to arm 64 at the pivot mount 68 is used to operate the microswitch 120, whereby the cam can be adjusted to cause operation of the microswitch at the desired precise arm position, e.g. just as the arm 64 begins to move downwardly and as it returns to its generally horizontal position against stop 76.

A sear 114 is lightly biased by spring 116 against the bucket arm 64 near the magnet 80, and when the bucket arm pivots to its lower position against stop 112, as shown in FIG. 7, the sear 114 engages the bucket arm at 118. This latches the bucket arm in its downward position as the coffee beans empty from the bean bucket 60, so that the bucket arm does not return to its weighing position under influence of the counterweight 70 despite the decreasing weight of coffee beans.

With reference to FIG. 3, the housing 12 of the coffee bean weigher and grinder 10 includes a feed hopper 122 positioned to catch coffee beans released from the bean bucket 60. The outlet 124 of the feed hopper 122 opens into the feed spout 126 of coffee grinder 130, which may be a commercially available unit, such as marketed by Grindmaster Corp. As best seen in FIGS. 1 and 8, the outlet port 132 of the coffee grinder 130 deposits the ground coffee in a receptacle, such as the brew basket 30 shown in FIG. 1 or the ground coffee receptacle/bagger 140 shown in FIG. 8. The brew basket 30 is held on a universal brew basket support arm assembly 136 or other suitable support which is capable of receiving and holding brew baskets an other receptacles of varying sizes. The support arm assembly 136 is more fully described in my co-pending U.S. Application entitled Universal Brew Basket Support Arms, Ser. No. 07/98,539, filed on even date herewith. The ground coffee receptacle/bagger is more fully discussed below.

Figure 9:
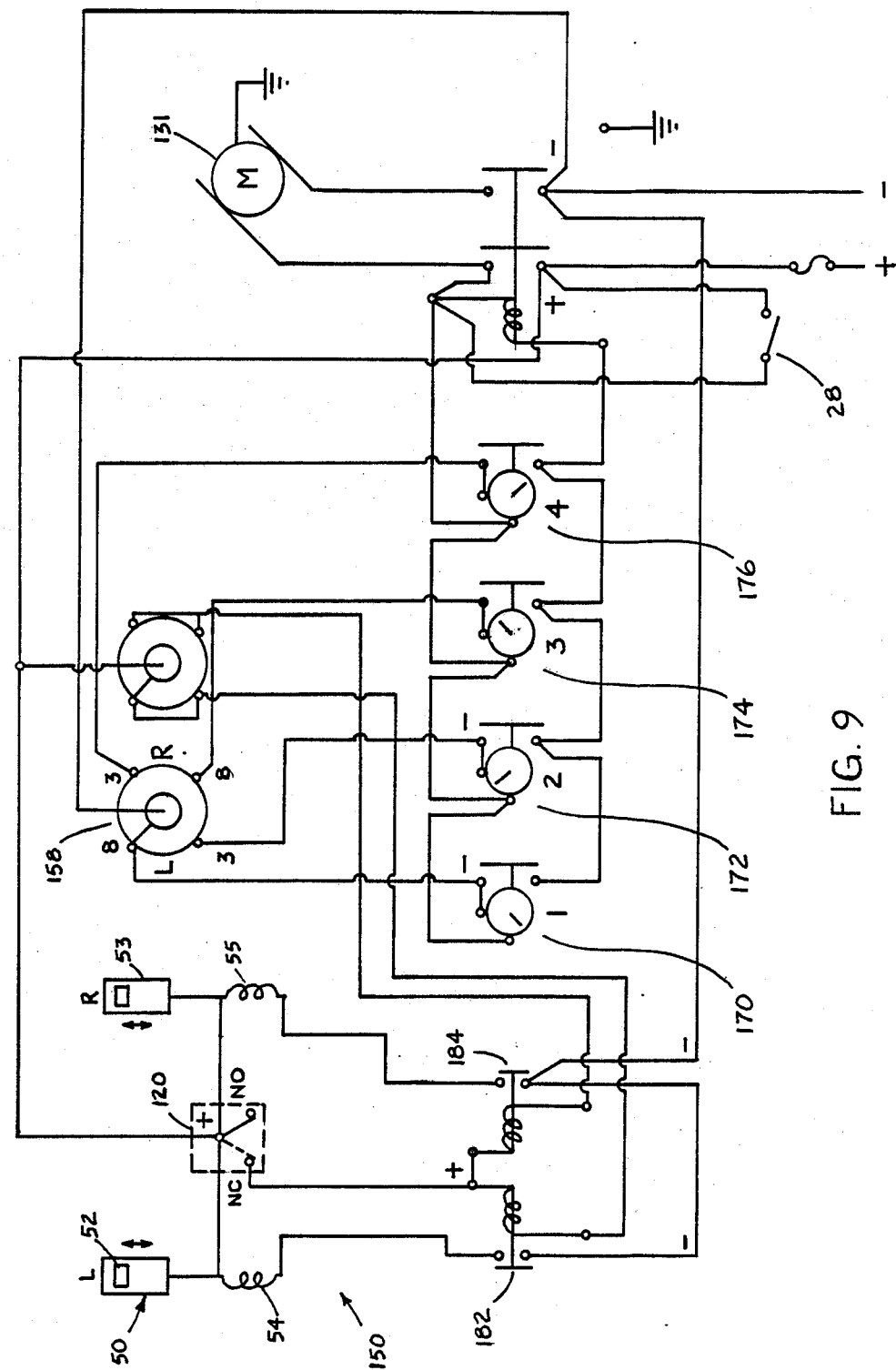
FIG. 9 is a schematic diagram of the control circuit of the coffee bean weighing and grinding apparatus of FIG. 1.

Control of the operation of the coffee bean weigher and grinder 10 is obtained by means of the control knob 25 and the central reset knob 26 in association with the circuit 150 of FIG. 9. With particular reference to FIG. 5, a square control rod 152 is slideably mounted within the barrel 90 of the control knob 25, the square control rod being keyed by a support washer 154 to rotate with the control knob 25. The control rod 152 is connected by a U-shaped flexible connector 156 to a rotary switch 158. As shown in FIG. 1 the control knob 25 has four positions, two of which select either 3 oz. or 8 oz. coffee bean weights of the regular coffee beans 1 in hopper 20 and two others of which select either 3 oz. or 8 oz. of the decaffeinated coffee beans 2 from the other hopper 22. Turning control knob 25 to the desired hopper and weight positions the proper one of the armatures 82, 84, 86 or 88 into operative position with respect to the magnet 80 for dispensing the desired weight, and a detent engagement at 27 holds the knob and armature accurately in the selected position. For purposes of illustration, the control knob 25 is shown selecting 3 oz. of regular coffee beans from hopper 20, placing armature 82 into operative position with respect to magnet 80.

The control knob 25 also positions the rotary switch 158 for operating the solenoid for the selected hopper valve and further sets a timer function for the coffee bean grinder corresponding to the selected amount of coffee beans. With reference to FIG. 9, the four terminals of the rotary switch 158 are respectively connected to timers 170, 172, 174 and 176. The timers provide the proper operating interval of the motor 131 of coffee grinder 131, including a brief overrun, for the amount of coffee beans selected. A starter solenoid 178 is used to control electrical power to the grinder motor. The position of a second ganged disk 158a of the rotary switch 158 also selects one of the hopper valve solenoids 54, 55 for operation through the solenoid latches 182, 184, as shown in FIG. 9.

The reset knob 26 is mounted to the end of the control rod 152 opposite rotary switch 128, and the reset knob 26 and rod 152 are slideable within the control knob 25. The reset knob may be pushed inwardly against a bias spring 160 and a circular washer 162 fixed to the control rod 152 is correspondingly displaced to dislodge the sear 114 from engagement with the balance arm 64. The engagement is seen in FIG. 7. Spring washer 164 acting against bracket 166 provides for retaining the control rod 152 and reset knob 26 against the bias action of spring 160.

Accordingly, the coffee bean weigher and grinder 10 is operated by first setting the control knob 25 to the desired type and weight of coffee and thereafter depressing the reset knob 26. Depressing the reset knob displaces the sear 114 and permits the bucket arm 64 to move to its upward position against stop 76 under influence of the counterweight 70. As the bucket arm approaches its horizontal position, it operates the microswitch 120. With reference to the control circuit illustrated in FIG. 9, operation of the microswitch 120 causes the solenoid associated with the selected coffee bean hopper to open the hopper valve plate and permit coffee beans to flow into the bean bucket 60.

Upon accumulation of a sufficient weight of coffee beans in the bean bucket 62, the magnetic attraction between the magnet 80 and the selected armature is overcome and the bucket arm 64 pivots downwardly. The downward motion of the bucket arm again operates the microswitch 120 to shut the hopper valve and also to initiate operation of the coffee bean grinder 130. It will be appreciated that the magnetic attraction between the magnet and armature is overcome while coffee beans are still flowing from the hopper; however, the armature adjustment is empirically set so that the "static" coffee beans in the bean bucket at the time of magnetic separation and operation of the microswitch 120 together with the remaining "dynamic" flow of coffee beans which are in the air and flow from the hopper prior to the hopper valve closing together add up to the desired weight of coffee beans.

As the bucket arm 64 pivots downwardly, coffee beans flow from the bottom of the bean bucket. The sear 114 engages the bucket arm 64 and maintains it in its downwardly pivoted position, whereby the coffee beans may continue to flow from the bean bucket until it is empty. The coffee beans are ground in the grinder 130 and deposited in the brew basket 30 or other container. The coffee grinder 130 ceases operation upon expiration of the time interval, and the bucket arm remains in its downward position until the reset button is pressed to initiate another cycle of operation.

On occasion, it is desired to grind coffee beans not stored in the hoppers provided in the coffee bean weigher and grinder 10. This may be accomplished by opening the auxiliary lid 32 and pouring the coffee beans down the passage 36 which bypasses the hoppers and leads to the inlet 126 of the coffee grinder 130. A separate switch 28 is mounted on the housing 12 to operate the coffee grinder 30 for this purpose.

Restaurants often have requests for purchase of ground coffee by patrons who were particularly pleased with the coffee served to them. It is a relatively simple matter to operate the coffee bean weigher and grinder apparatus to cause a desired amount of coffee beans to be ground for the customer's, eventual use. The ground coffee receptacle/bagger 140, shown in FIGS. 10-12, provides a convenient device for accepting the ground coffee from the coffee grinder 130 and placing the ground coffee into a container such as a bag or coffee can. The ground coffee bagger 140 includes a cylindrical side wall 141 having an upper flange 142 similar to a standard coffee brew basket, whereby the coffee receptacle/bagger 140 is readily received on the brew basket support assembly 136. A handle 138 is secured to the sidewall 141. The coffee bagger has a conical bottom wall 143 terminating in a central discharge spout 144. An elongated inverted conical stopper 145 is slideably received in the discharge spout 144 and in its down position shown in full lines in FIG. 11 blocks the discharge spout. A lever arm 146 is pivotally mounted to the handle 138 at 147, and the lever has an operating knob 148 protruding above the handle. The other end of the lever arm 146 is pivotally connected at 149 to the upper end of stopper 145 for lifting the stopper. Thus, once the ground coffee is collected in the ground coffee receptacle/bagger 140, it may be removed from the coffee bean weigher and grinder 10 and the discharge spout 145 may be placed in or over the mouth of the bag. Pressing the end 148 of lever 146 lifts the stopper 145 and permits the ground coffee to flow into the bag. The inverted conical shape of the stopper assures that all of the ground coffee flows out the discharge spout 145.

It will be appreciated that various changes in the preferred embodiment coffee bean weigher and grinder described above may be made by those skilled in the art without departing from the spirit and scope of the invention herein. As examples, the coffee bean weigher and grinder may employ more or fewer hoppers, and the number of weight selections can also be increased or decreased. Accordingly, the preferred embodiment described above is illustrative only and the scope of the invention is defined in the following claims.

I claim:

1. Apparatus for weighing and grinding selectable predetermined amounts of selectable types of coffee beans, the apparatus comprising:
    (a) at least two storage hoppers each respectively receiving and storing a supply of coffee beans, said hoppers each defining a bottom outlet opening through which said coffee beans are gravitationally flowably releasable;
    (b) hopper valve means closing the hopper outlet openings and operable to permit flow of coffee beans from a selected one of said storage hoppers;
    (c) a bean bucket deployed for receiving coffee beans released from the hoppers through the hopper valve means, said bean bucket having a bottom discharge opening for gravitationally flowably releasing coffee beans;
    (d) bean bucket valve means for alternatively preventing an permitting the gravitational flowable release of coffee beans from the bean bucket;
    (e) grinder means for gravitationally receiving and grinding coffee beans released from the bean bucket;
    (f) means for operating the hopper valve means to open a selected one of the hoppers and to close the hopper valve means when substantially all of one of at least two selectable amounts of coffee beans have been received in said bean bucket and for operating the bean bucket valve means to permit flow of the coffee beans released from said selected one of the hoppers into the grinder means; and
    (g) means for selecting the hopper containing the desired coffee beans and for selecting the desired weight thereof.

2. Apparatus for weighing and grinding coffee beans as defined in claim 1 wherein the hopper valve means includes a hopper valve plate slideably mounted under the hopper outlet of each of said hoppers, each said plate having an opening registrable with a different hopper outlet, and drive means for sliding each said hopper valve plate between open and closed positions.

3. Apparatus for weighing and grinding coffee beans as defined in claim 2 wherein the drive means comprise a solenoid and return spring for each slideably mounted hopper valve plate.

4. Apparatus for weighing and grinding coffee beans as defined in claim 1 wherein said bean bucket is supported on a pivotally mounted bucket arm and said means for operating the hopper valve means when one of the selectable amounts of coffee beans have been received in the bean bucket includes means releasably holding the pivotally mounted bucket arm in an upward position and releasing the bucket arm when substantially all of the selected amount of coffee beans have been received in the bean bucket, the weight thereof overcoming the releasable holding means, and means responsive to the initial pivoting motion of the bucket arm for closing the hopper valve means.

5. Apparatus for weighing and grinding coffee beans as defined in claim 4 wherein the means releasably holding the bucket arm comprise a plurality of two operatively positioned magnetic elements: one of which is mounted on the bucket arm.

6. Apparatus for weighing and grinding coffee beans as defined in claim 5 wherein the means for operating the hopper valve means when one of at least two selectable amounts of coffee beans have been received in the bean bucket includes a knob having the remainder of said plurality of magnetic elements mounted thereon and rotatable to position one of the knob-mounted magnetic elements into operative relationship with the bucket arm-mounted magnetic element, thereby releasably holding the bucket arm, wherein each said knob-mounted magnetic element provides a magnetic attraction with said bucket arm mounted magnetic element corresponding to a desired amount of coffee beans.

7. Apparatus for weighing and grinding coffee beans as defined in claim 6 wherein the position-dependent magnetic attraction of each of the magnetic elements mounted on the knob is adjustable.

8. Apparatus for weighing and grinding coffee beans as defined in claim 6 wherein the bucket arm-mounted magnetic element is a permanent magnet and the knob-mounted magnetic elements comprise a plurality of armatures each providing magnetic attraction in accordance with a desired selectable amount of coffee beans.

9. Apparatus for weighing and grinding coffee beans as defined in claim 4 wherein the means responsive to initial pivoting of the bucket arm for closing the hopper valve means is a microswitch, said microswitch being connected in a circuit including drive means for closing the hopper valve means.

10. Apparatus for weighing and grinding coffee beans as defined in claim 9 wherein the hopper valve means comprise a slideably mounted hopper valve plate for each hopper, the hopper valve plate having an opening registrable with the bottom hopper outlet and further comprising a solenoid for opening each hopper valve plate, wherein operation of the microswitch on pivoting of the bucket arm causes the solenoid to close the hopper valve means.

11. Apparatus for weighing and grinding coffee beans as defined in claim 10 wherein the solenoids are deployed for opening the hopper valve plates and further comprising return springs for closing the hopper valve plates.

12. Apparatus for weighing and grinding coffee beans as defined in claim 9 and further comprising means releasably holding the pivot arm in its downwardly pivoted position after closing of the hopper valve.

13. Apparatus for weighing and grinding coffee beans as defined in claim 12 and further comprising reset means for returning the bucket arm to its upward position.

14. Apparatus for weighing and grinding coffee beans as defined in claim 13 wherein the microswitch operates the circuit to open the hopper valve means upon return of the bucket arm to its upward position.

15. Apparatus for weighing and grinding coffee beans as defined in claim 14 wherein said bucket arm also mounts a counter weight for biasing the bucket arm to return to its upward position.

16. Apparatus for weighing and grinding coffee beans as defined in claim 4 wherein the bean bucket valve means comprise a stem valve extending downwardly into the bean bucket and blocking the bottom discharge opening thereof when the bucket arm is in its releasably held position, wherein when the bucket and bucket arm pivot downwardly away from the stem valve, the bottom discharge opening in the bean bucket is unblocked to permit free gravitational outflow of coffee beans.

17. Apparatus for weighing and grinding coffee beans as defined in claim 16 wherein the stem valve extends to closely adjacent the periphery of the bean bucket discharge opening in its closed position, but does not touch the bean bucket.

18. Apparatus for weighing and grinding coffee beans as defined in claim 17 wherein said stem valve is pivotally mounted and maintained in alignment with the bean bucket discharge opening by guide means extending from the stem valve to the bean bucket.

19. Apparatus for weighing and grinding coffee beans as defined in claim 16 and further comprising latch means to engage and hold the bucket arm in its downwardly pivoted position, whereby clearance between the stem valve and bean bucket discharge opening is maintained while the beans exit the bean bucket.

20. Apparatus for weighing and grinding coffee beans as defined in claim 19 wherein the bucket arm is biased to its upward position by means of a counterweight.

21. Apparatus for weighing and grinding coffee beans as defined in claim 4 wherein said bean bucket is pivotally mounted on the bucket arm.

22. Apparatus for weighing and grinding coffee beans as defined in claim 21 wherein the bean bucket valve means comprise a stem valve extending downwardly into the bean bucket and blocking the bottom discharge opening thereof when the bucket arm is in its releasably held position, wherein when the bucket and bucket arm pivot downwardly away from the stem valve, the bottom discharge opening in the bean bucket is unblocked to permit free gravitational outflow of coffee beans.

23. Apparatus for weighing and grinding coffee beans as defined in claim 22 wherein the stem valve extends to closely adjacent the periphery of the bean bucket discharge opening in its closed position, but does not touch the bean bucket.

24. Apparatus for weighing and grinding coffee beans as defined in claim 23 wherein said stem valve is pivotally mounted and maintained in alignment with the bean bucket discharge opening by guide means extending from the stem valve to the bean bucket.

25. Apparatus for weighing and grinding coffee beans as defined in claim 1 and further comprising means defining a bypass passage for feeding coffee beans directly to the grinder means and switch means for operating the grinder means.

26. Apparatus for weighing and grinding coffee beans as defined in claim 1 wherein at least a portion of the storage hoppers is transparent for ascertaining the level and condition of the coffee beans stored therein.

27. Apparatus for weighing and grinding coffee beans as defined in claim 1 and further comprising means for removably receiving and supporting a coffee maker brew basket position to receive the ground coffee output of the grinder.

28. Apparatus for weighing and grinding coffee beans as defined in claim 1 and further comprising a ground coffee receptacle/bagger and means for removably receiving and supporting the ground coffee receptacle/bagger to receive the ground coffee output of the grinder, said ground coffee receptacle/bagger including a body adapted to receive ground coffee and a bottom discharge spout and valve means manually manipulatable for opening the hopper valve means to discharge ground coffee.

29. Apparatus for weighing and grinding coffee beans as defined in claim 28 wherein the ground coffee receptacle/bagger further comprises a handle mounted to the exterior of the body and lever mean extending from the handle to the valve means for opening the valve means.

30. Apparatus for weighing and grinding a selectable predetermined amount of coffee beans, the apparatus comprising:
(a) hopper means including at least one storage hopper receiving and storing a supply of coffee beans and defining a bottom outlet opening through which said coffee beans are freely gravitationally flowable;
(b) hopper valve means controlling the release of coffee beans from the hopper means, including a hopper valve for each hopper outlet opening, and drive means for opening and closing each hopper valve;
(c) a bean bucket deployed for receiving coffee beans released from the hopper means through the hopper valve means, said bean bucket defining a bottom discharge opening for gravitationally discharging the coffee beans, said bean bucket mounted on a bucket arm pivotally mounted for movement between an upward position and a downward position;
(d) magnetic holding means releasably holding the bucket arm in its upward position while coffee beans flow into the bean bucket, said releasable magnetic holding means including a first magnetic element mounted to the bucket arm and a plurality of selectable second magnetic elements individually operatively positionable to provide a selectable holding force, whereby the bucket arm is released when the weight of the beans therein overcomes the selected releasable magnetic holding means;

(e) a bean bucket stem valve depending into the bean bucket and having its distal end positioned to block the bean bucket bottom discharge opening when the bean bucket arm is in its upward position, whereby when the bucket arm pivots to its downward position, the bean bucket bottom discharge opening is exposed to permit the free gravitational flow of coffee beans therefrom; and (f) a grinder positioned to receive coffee beans released from the bean bucket and adapted to grind the coffee beans and discharge them as ground coffee.

31. Apparatus for weighing and grinding coffee as defined in claim 30 wherein the hopper means comprises at least two storage hoppers and further comprising means for selecting one storage hopper for releasing coffee beans.

32. Apparatus for weighing and grinding coffee beans as defined in claim 30 wherein the plurality of second magnetic elements are mounted on a rotatable control knob for operatively positioning a selected one of the second magnetic elements, and each of the second magnetic elements is adjustable on the rotatable control knob to select a weight of coffee beans to be weighed and ground.

33. Apparatus for weighing and grinding coffee beans as defined in claim 32 wherein the control knob mounts four magnetic elements and has detents for operatively positioning each of the second magnetic elements with respect to the first magnetic element mounted on the bucket arm.

34. Apparatus for weighing and grinding coffee beans as defined in claim 32 further comprising timer means connected to said control knob for operating the grinder for an appropriate time interval for the weight of coffee beans selected.

35. Apparatus for weighing and grinding coffee as defined in claim 32 wherein the hopper means comprises at least two storage hoppers and further comprising means for selecting one storage hopper for releasing coffee beans.

36. Apparatus for weighing and grinding coffee beans as defined in claim 35 wherein the control knob selects operation of one of the hopper valves.

37. Apparatus for weighing and grinding coffee beans as defined in claim 30 and further comprising latch means for latching the bucket arm in a downward position with the bottom discharge thereof open for releasing coffee beans therefrom.

38. Apparatus for weighing and grinding coffee beans as defined in claim 37 and further comprising a microswitch operated by movement of the bucket arm, said microswitch causing a selected hopper valve to open when the bucket arm is releasably held in its upward position and to close when the bucket arm pivots from its releasably held upward position.

39. Apparatus for weighing and grinding coffee beans as defined in claim 38 and further comprising reset means for releasing the latch means and bias means for returning the bucket arm to its upward position upon release of the latch means.

40. Apparatus for weighing and grinding selectable predetermined amounts of selectable types of coffee beans, the apparatus comprising:

(a) hopper means including at least one storage hopper receiving and storing a supply of coffee beans and defining a bottom outlet opening through which said coffee beans are gravitationally flowably releasable;

(b) hopper valve means controlling the release of coffee beans from the hopper means, including a hopper valve for each hopper outlet opening and means for opening and closing each hopper valve;

(c) a bean bucket deployed for receiving coffee beans released from the hopper means through the hopper valve means, said bean bucket having a bottom discharge opening for gravitationally flowably releasing coffee beans;

(d) bean bucket valve means for alternatively preventing and permitting the gravitational flowable release of coffee beans from the bean bucket;

(e) grinder means for gravitationally receiving and grinding coffee beans released from the bean bucket;

(f) means for operating the hopper valve means to open a selected one of the hoppers and to close the hopper valve means when substantially all of one of at least two selectable amounts of coffee beans have been received in said bean bucket and for operating the bean bucket valve means to permit flow of the coffee beans released from the hopper into the grinder means;

(g) means for selecting the hopper containing the desired coffee beans and for selecting the desired weight thereof; and (h) a ground coffee receptacle/bagger adapted to received ground coffee from a coffee grinder, including:

(1) an upper cylindrical side wall and a downwardly converging bottom wall forming an open-topped container for receiving ground coffee.

(2) said downwardly converging bottom wall defining a discharge spout for gravitationally releasing ground coffee from the open-topped container;

(3) manually operable value means selectively blocking the discharge spout while ground coffee is being received in the open-topped container and opening the discharge spout to release ground coffee.

* * * * *